Feb. 20, 1968 O. B. REEVES ETAL 3,369,794
SUPPORT RACK FOR VEHICLES
Filed Sept. 16, 1966 3 Sheets-Sheet 2
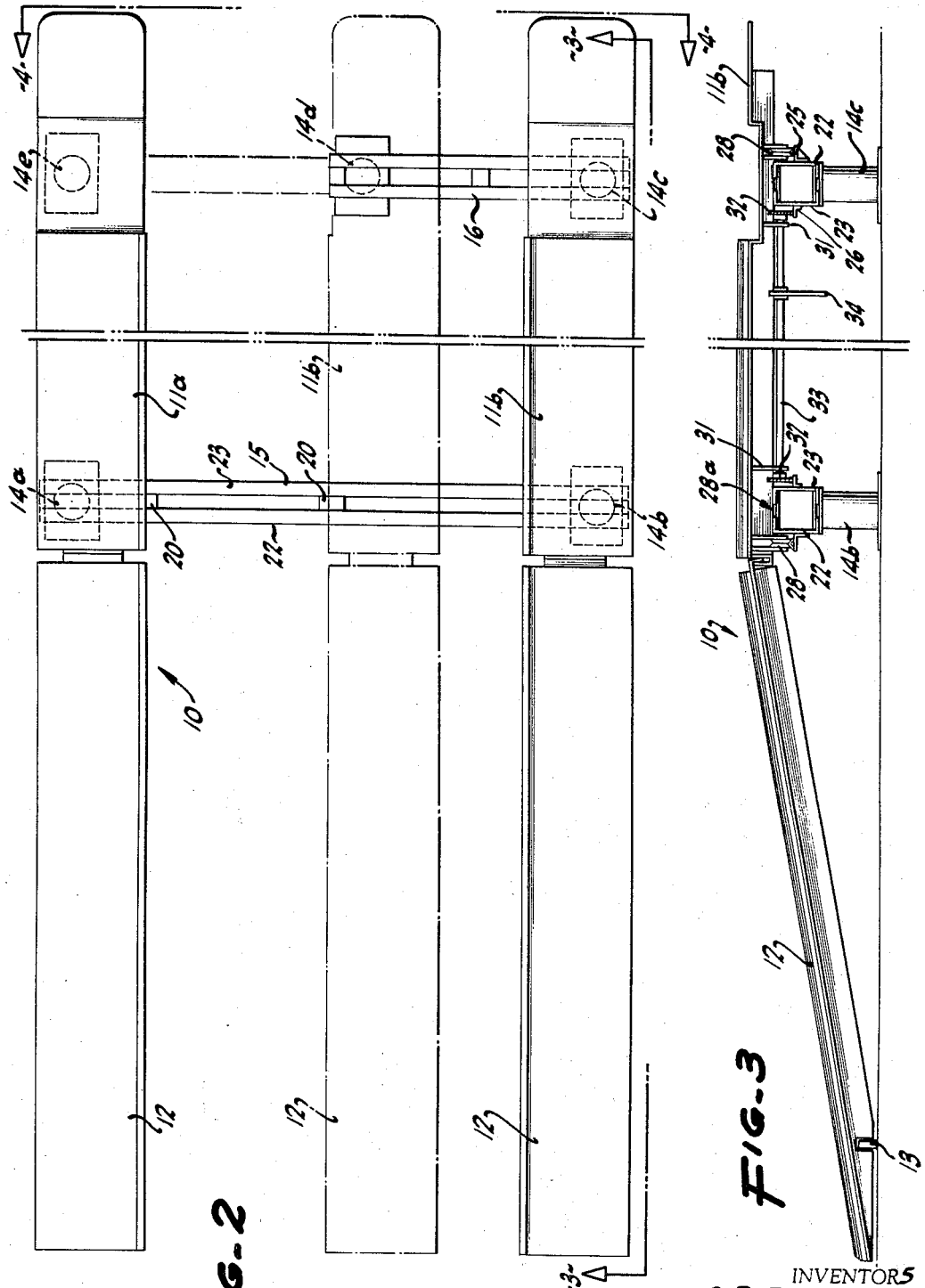
INVENTORS
O.B. REEVES
HAROLD W. SATTLER
BY
Draper B. Gregory
ATTORNEY Feb. 20, 1968  O. B. REEVES ETAL  3,369,794
SUPPORT RACK FOR VEHICLES
Filed Sept. 16, 1966  3 Sheets-Sheet 3
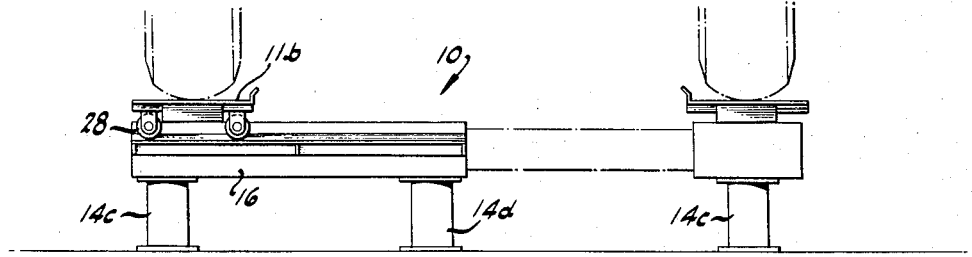
FIG. 4
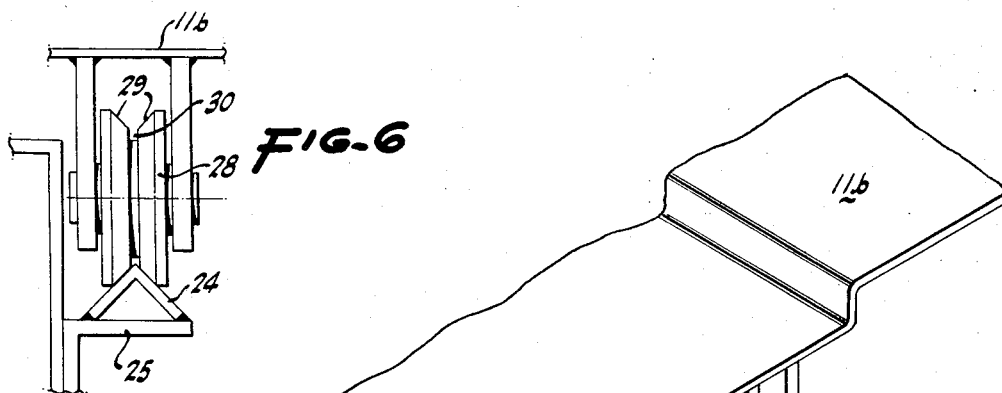
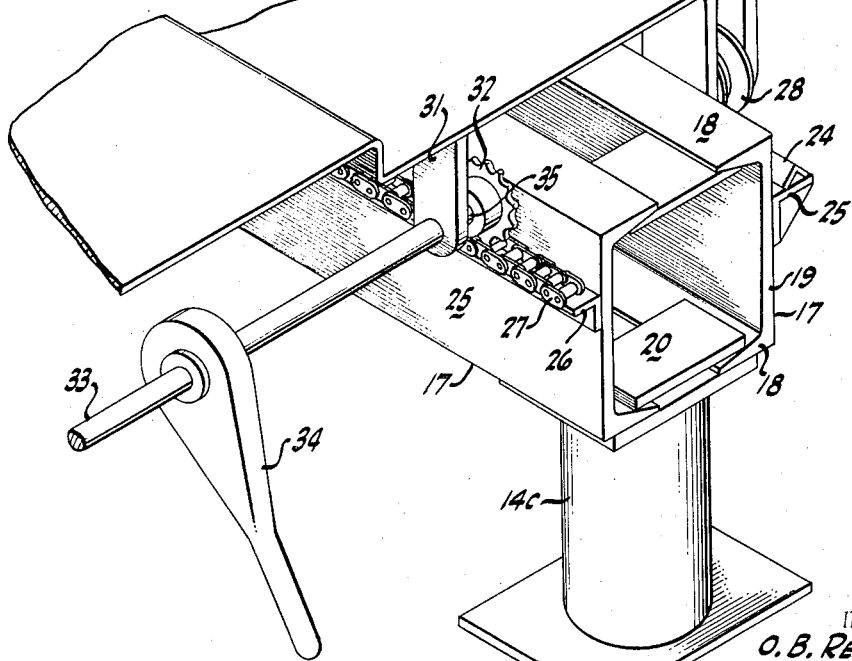
FIG. 5
INVENTORS
O. B. REEVES
HAROLD W. SATTLER
BY Draper B. Gregory
ATTORNEY United States Patent Office 3,369,794
Patented Feb. 20, 1968

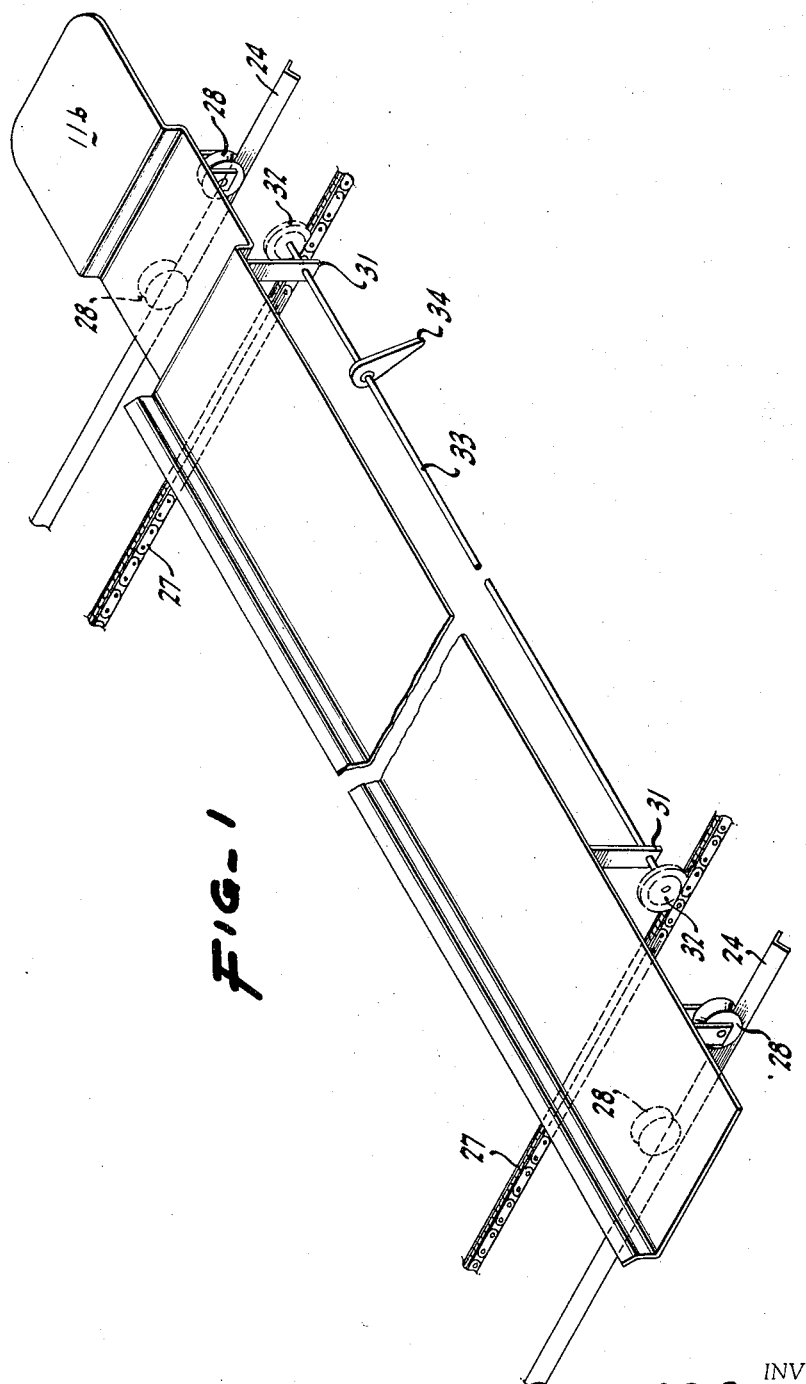

3,369,794
SUPPORT RACK FOR VEHICLES
O. B. Reeves and Harold W. Sattler, both of 740 Harrison
St., San Francisco, Calif. 94103
Filed Sept. 16, 1966, Ser. No. 580,568
2 Claims. (Cl. 254—88)

ABSTRACT OF THE DISCLOSURE

The nature and gist of the technical disclosure of the invention herein, lies in a mechanical means for rapidly changing and then fixing the lateral distance between two runways upon which the wheels of a motor vehicle are to be placed.

---

This invention concerns itself with an improvement in a supporting rack, and more particularly pertains to an improved means for the rapid and easy adjustment of lateral spacing between platforms or ramps upon which material or objects are to be positioned.

Prior to this improvement, the accurate, easy and continuous lateral displacement of a platform or ramp designed to accommodate heavy loads has been difficult due primarily to the weight and physical configuration of the platforms or ramps.

It is therefore an object of this invention to provide a simple and comparatively inexpensive means for the adjustment of lateral spacing between movable platforms or ramps.

Another object of the invention is to provide a means whereby adjustment of the lateral spacing between the platforms or ramps may be effected in a continuous manner.

Another object of the invention is to provide a means whereby a desired variation in lateral spacing between movable platforms or ramps may be effected accurately and thereafter maintained without the use of additional structure.

Another object of this invention is to provide a means for the desired displacement of platforms or ramps transversely of each other through the use of structural components which are more easy to service and maintain, as well as being less susceptible to malfunction due to the introduction of dirt or other foreign material.

These and other objects and advantages of the improvement will become more fully apparent from the following description and accompanying drawings, in which:

FIG. 1 is a fragmentary schematic perspective view disclosing the basic structural components of the invention.

FIG. 2 is a plan view of a specific embodiment of the invention in an automobile servicing rack or runway.

FIG. 3 is a side elevation of the device shown in FIG. 2 taken generally on line 3—3 of FIG. 2.

FIG. 4 is a vertical front view taken generally on line 4—4 of FIG. 2.

FIG. 5 is a detailed fragmentary perspective of a portion of FIG. 1.

FIG. 6 is a vertical front view of a weight-supporting wheel and track combination shown in FIGS. 1 and 5.

A specific embodiment of the invention shall be disclosed in a conventional automobile servicing rack 10 illustrated in FIGS. 2, 3 and 4. The rack consists generally of a fixed horizontal platform 11a (FIG. 2) and a movable horizontal platform 11b. A ramp 12 is removably attached to each platform (FIG. 3) in an inclined fashion. In order to allow the ramp attached to the movable platform to move with it, its distal end is provided with a plurality of rubber wheels 13 (FIG. 3).

Five vertical posts, 14a, 14b, 14c, 14d and 14e, are positioned as shown in FIGS. 2, 3 and 4. A long beam 15 is rigidly affixed in conventional fashion to the top of posts 14a and 14b (FIG. 2), so that its longitudinal axis is at right angles to the longitudinal axis of each platform 11a and 11b. A short beam 16 having a cross-section identical with that of the long beam is rigidly affixed to the tops of posts 14c and 14d (FIGS. 2 and 4) so that the longitudinal axis of the short beam is parallel with the longitudinal axis of the long beam.

The reason the short beam 16 is used is to allow personnel easier access to the underside of a vehicle when it is on the servicing rack (FIG. 4). If this feature of easier accessibility is not desired, post 14d may be eliminated, and short beam 16 replaced by another long beam 15 thence supported by posts 14c and 14e.

The description of the long beam 15 is identical to that of the short beam 16 except for the length of their respective longitudinal axes; consequently, the description will be confined to that for the long beam as follows:

The long beam 15 consists of two conventional channel beams 17 (FIG. 5). Each channel beam consists of two flanges 18 which are positioned so that the flanges are spaced from each other and at right angles to a web 19. Each channel beam is held in opposing and fixed spaced relation from the other as shown in FIG. 5 by a plurality of plates 20 which are spaced along the longitudinal axis of the long beam (FIG. 2) and rigidly affixed to the opposing flanges by conventional means.

The long beam 15 and short beam 16 each have an outer face 22 and an inner face 23 (FIGS. 3 and 5). In order to accommodate a triangularly cross-sectioned rail 24 (FIGS. 5 and 6), each outer face has a shelf 25 which extends along the entire length of the outer face.

Each inner face 23 has a right-angled projection 26 that extends along the entire length of the inner face (FIG. 5) in order to accommodate a predetermined length of roller chain 27 which is affixed thereto.

Having described the structure upon which the movable platform 11b is supported, we now present a more detailed description of the movable platform as follows:

Underneath each end of the movable platform 11b are rigidly attached two weight-bearing metal wheels 28 of conventional design (FIGS. 1, 4 and 5). Each metal wheel is designed to roll upon the entire length of the rail 24. In addition, the metal wheels extend downwardly from the movable platform a certain distance so that two results are effected as follows:

When there is no appreciable weight resting upon the movable platform 11b, there is a minimal vertical clearance 28a (FIG. 3) existing between the movable platform and the long beam 15 and short beam 16, so that when it is desired to move the movable platform, it will pass over the long beam. However, when an automobile or other appreciable weight is supported by the movable platform, the vertical clearance 28a existing between the movable platform and the long beam 15 and short beam 16 desirably becomes zero, thus maintaining the movable platform in its desired position without the need for additional structure.

The metal wheels 28 each have a physical configuration as shown by FIG. 6. Each metal wheel is provided with beveled faces 29 that contact the rail 24 and transmit the weight of the movable platform 11b to the rail. In addition, each metal wheel also has a recessed slot 30 extending completely around it. Consequently, in the event foreign material should be introduced onto the weight-bearing surfaces of the rail or beveled faces, the foreign material will more likely be displaced away from the weight-bearing surfaces and into the recessed slot 30 for eventual extrusion therefrom as the metal wheel rolls over the rail. In this manner, foreign material is less likely to cause undesirable jamming or vertical displacement of the metal wheels and movable platform 11b.

Having described the weight-bearing structure of the invention, we now commence a detailed description of the means for the accurate and selective displacement of the movable platform 11b transversely of the fixed platform 11a as follows:

The movable platform 11b is provided with two downwardly-projecting arms 31 (FIGS. 3 and 5), each of which is positioned so that it is proximal to the inner face 23 but sufficiently displaced inwardly therefrom so that a toothed sprocket 32 may be accommodated between the arm and inner face (FIG. 5).

A rigid, elongated rod 33 (FIGS. 3 and 5) is carried by the two arms 31 in a conventional manner so that the rod may be easily rotated upon its longitudinal axis by selective manual manipulation of a conventional, reversible ratchet wrench 34 (FIGS. 1 and 5) which is attached to the rod.

The rod 33 has two distal ends 35 which project through the arms 31 a sufficient distance so that the toothed sprocket 32 may be rigidly attached upon each distal end without coming into contact with the arm or inner face 23 (FIG. 5).

The positioning of the rod 33, the arms 31, the projection 26, and the inner face 23 relative to each other, as well as the configuration and dimensions of the toothed sprocket 32 and roller chain 27 (FIG. 5), is such that when the metal wheels 28 ride upon the rails 24, the toothed sprocket desirably engages the roller chain.

The manner of using the inventive improvement as well as the mode of operation is as follows:

When it is desired to vary the lateral spacing between a fixed platform 11a and a movable platform 11b in order to accommodate the various tread widths of motor vehicles ranging from trucks to small sports cars, an operator will manually manipulate the ratchet wrench 34 in the desired direction. Movement of the ratchet wrench imparts torque to the rod 33 and toothed sprocket 32, the latter of which continually rides in engaged fashion with the roller chain 27. As the toothed sprocket is positively moved upon the roller chain, a linear force parallel to the roller chain and rail 24, is exerted by the rod 33 upon the arms 31 and thence upon the movable platform 11b which is allowed to move freely because the weight of the movable platform is entirely supported by the metal wheels 28 that ride upon the rails 24. If the ramps 12 are positioned upon the fixed and movable platforms, lateral displacement can still be effected without removing the ramps, because the rubber wheels 13 located on the ramp attached to the movable platform allows this ramp to move freely with the movable platform.

While a preferred, specific embodiment of the invention has been shown and described, it is not intended to relinquish any rights which could occur through various changes and apparent modifications in the details of the invention without departing from the spirit and scope of the appended claims.

Having thus described our invention, we claim:

1. In a device of the character described, the combination comprising a pair of elongated platforms parallel to and spaced from each other upon which an automobile is designed to rest, each of said platforms being of the same length and physical configuration as the other, except that one platform is fixed, while the other platform is movable toward and away from said fixed platform; a ramp attached in hinged, movable fashion to each platform at the same end thereof; a plurality of rubber wheels provided at the distal end of that ramp which is attached to the movable platform; five vertical posts whose tops are all in the same horizontal plane, the first pair of which is positioned so that the posts of such first pair are laterally spaced from each other a horizontal distance equal at least to the widest wheel base of conventional motor vehicles such distance being at right angles to the longitudinal axes of the fixed platform and movable platform, the second pair of the five vertical posts being laterally positioned from each other the same as the first pair except that the first pair and second pair are displaced from each other longitudinally of the fixed and movable platforms a distance equal to the desired effective length of said fixed and movable platforms so that the first and second pairs of the five vertical posts form the four corners of a rectangle, the fifth vertical post being positioned between the second pair of vertical posts at a point the location of which depends upon the desired length of travel of the movable platform transversely of the fixed platform; a long beam attached to the tops of the first pair of vertical posts; a short beam attached to the top of the fifth vertical post and to the top of one of the second pair of vertical posts; a block affixed to the top of that post of the second pair of vertical posts upon which the short beam is not attached, such block having a height equal to the height of the long beam and short beam; a horizontal shelf on the outer face of both the long beam and short beam, such shelf extending longitudinally of the long beam and short beam a distance equal to the desired length of travel of the movable platform; a rail of triangular cross-section whose apex extends upwardly, said rail being affixed to the top of each shelf for the entire length thereof; a flat-topped projection extending horizontally from the inner face of the long beam and short beam a predetermined distance and along the entire length of the long beam and short beam; a linked roller chain affixed to the top of the projections and extending along the entire length of such projections; a plurality of metal wheels attached to the movable platform at a location proximal to the ends of the movable platform, such wheels having inwardly-beveled, weight-bearing surfaces and a recessed slot, such wheels further being designed to ride upon the rails for the entire length thereof until stopped by a conventional abutment located at the ends of the rails, such wheels further being positioned downwardly from the movable platform a distance such that there is a predetermined minimal vertical clearance existing between the tops of the long and short beams and the bottom of the movable platform when there is no motor vehicle upon the movable platform, thus allowing the movable platform to be readily moved transversely of the fixed platform through the use of a reversible ratchet wrench, however, when a vehicle is upon the movable platform, the minimal vertical clearance becomes zero by virtue of the minimal elasticity inherent in the metal of which the platforms and the components attached and appurtenant thereto are composed, thus the movable platform is kept in its desired position by virtue of the frictional forces then existing between the movable platform and the short beam and long beam; two arms designed to carry an elongated rod, such arms being rigidly attached to the movable platform and descending therefrom, each arm being positioned proximal to, but yet inwardly displaced from the projections on the inner faces of the long beam and short beam a distance that allows the insertion and unimpeded rotation of a toothed sprocket between the arms and the inner faces of the long beam and short beam, such arms further being provided with an opening for accommodating the elongated rod, such openings being positioned a distance below the movable platform that at all times, the toothed sprocket attached to each end of the elongated rod is kept in desirable engagement with the roller chain; an elongated rod carried by the arms; a toothed sprocket rigidly attached to each end of the elongated rod; and a reversible ratchet wrench affixed to the elongated rod in such manner that if desired, the ratchet wrench may be placed in its neutral gear thereby allowing the wrench to be rotated upon the longitudinal axis of the elongated rod until the handle of the wrench is located underneath and proximal to the movable platform, whereupon, such handle may be secured to the movable platform by conventional means and the ratchet wrench then taken out of neutral gear thereby providing an additional means for maintaining the movable platform in its desired position.

2. A motor vehicle support rack, comprising a fixed platform and a movable platform; means for allowing motor vehicle ingress and egress to the fixed and movable platforms; means for maintaining the fixed and movable platforms in an elevated position from the ground; means for allowing the movable platform to move back and forth transversely of the fixed platform; means for selectively imparting a linear force to the movable platform in order to move it transversely of the fixed platform; means for maintaining the movable platform in its desired position through the use of frictional force; and additional means for maintaining the movable platform in its desired position by securing the linear force-imparting means against further movement.

References Cited

UNITED STATES PATENTS

| | | | |
|---|---|---|---|
| 2,556,929 | 6/1951 | Mervine | 254—88 |
| 2,962,980 | 12/1960 | Carrigan | 254—88 XR |
| 3,294,367 | 12/1966 | Liskey | 254—88 |

FOREIGN PATENTS 666,230   7/1963   Canada.

OTHELL M. SIMPSON, *Primary Examiner.*